(12) United States Patent
Guim Bernat et al.

(10) Patent No.: US 10,713,173 B2
(45) Date of Patent: Jul. 14, 2020

(54) MEMORY CONTROLLER WITH PRE-LOADER

(71) Applicant: Intel Corporation, Santa Clara, CA (US)

(72) Inventors: Francesc Guim Bernat, Barcelona (ES); Kshitij Doshi, Tempe, AZ (US)

(73) Assignee: Intel Corporation, Santa Clara, CA (US)

( * ) Notice: Subject to any disclaimer, the term of this patent is extended or adjusted under 35 U.S.C. 154(b) by 111 days.

(21) Appl. No.: 16/123,818

(22) Filed: Sep. 6, 2018

(65) Prior Publication Data

US 2019/0042437 A1 Feb. 7, 2019

(51) Int. Cl.
*G06F 12/12* (2016.01)
*G06F 12/0862* (2016.01)

(52) U.S. Cl.
CPC .. *G06F 12/0862* (2013.01); *G06F 2212/1024* (2013.01); *G06F 2212/6024* (2013.01)

(58) Field of Classification Search
CPC ............. G06F 12/0862; G06F 12/0802; G06F 2212/1024; G06F 2212/6024–6032
See application file for complete search history.

(56) References Cited

U.S. PATENT DOCUMENTS

| | | | | |
|---|---|---|---|---|
| 10,095,418 B1* | 10/2018 | Gong | .................... | G06F 3/0665 |
| 2004/0073769 A1* | 4/2004 | Debes | ................. | G06F 12/0875 |
| | | | | 711/217 |
| 2006/0004966 A1* | 1/2006 | Maeda | ................ | G06F 12/0862 |
| | | | | 711/137 |
| 2009/0198950 A1* | 8/2009 | Arimilli | .............. | G06F 12/0862 |
| | | | | 711/205 |
| 2009/0216956 A1* | 8/2009 | Ekanadham | ........ | G06F 12/0862 |
| | | | | 711/137 |
| 2011/0238920 A1* | 9/2011 | Hooker | ............... | G06F 12/0862 |
| | | | | 711/136 |
| 2013/0124780 A1* | 5/2013 | Baderdinni | ............. | G06F 3/061 |
| | | | | 711/103 |
| 2013/0145095 A1* | 6/2013 | McKean | ........... | G06F 16/24552 |
| | | | | 711/122 |
| 2013/0265825 A1* | 10/2013 | Lassa | .................... | G06F 3/0619 |
| | | | | 365/185.11 |

(Continued)

OTHER PUBLICATIONS

I. Burcea, J. Zebchuk and A. Moshovos, "Teaching old caches new tricks: RegionTracker and predictor virtualization," 2009 IEEE Pacific Rim Conference on Communications, Computers and Signal Processing, Victoria, BC, 2009, pp. 957-962. (Year: 2009).*

*Primary Examiner* — Khoa D Doan
(74) *Attorney, Agent, or Firm* — Schwabe, Williamson & Wyatt, P.C.

(57) ABSTRACT

Embodiments of the present disclosure relate to a controller that includes a monitor to determine an access pattern for a range of memory of a first computer memory device, and a pre-loader to pre-load a second computer memory device with a copy of a subset of the range of memory based at least in part on the access pattern, wherein the subset includes a plurality of cache lines. In some embodiments, the controller includes a specifier and the monitor determines the access pattern based at least in part on one or more configuration elements in the specifier. Other embodiments may be described and/or claimed.

20 Claims, 7 Drawing Sheets

(56) References Cited

U.S. PATENT DOCUMENTS

| | | | |
|---|---|---|---|
| 2014/0047190 A1* | 2/2014 | Dawkins | G06F 12/0813 |
| | | | 711/136 |
| 2014/0129665 A1* | 5/2014 | Chan | H04L 67/08 |
| | | | 709/212 |
| 2016/0117254 A1* | 4/2016 | Susarla | G06F 12/0862 |
| | | | 711/119 |
| 2017/0353576 A1 | 12/2017 | Guim Bernat et al. | |

* cited by examiner

MEMORY CONTROLLER WITH PRE-LOADER

FIELD

Embodiments of the present disclosure generally relate to the field of computer memory and, more particularly, to devices and techniques that provide pre-loading of computer memory.

BACKGROUND

In computer systems, some computing applications are expected to produce results quickly, but face performance and flexibility challenges as their datasets grow exponentially. Some of these computing applications are executed with in-memory computing, where operations may run at cache speeds and large numbers of central processing units (CPUs) may work collaboratively together. As data growth continues, it is not possible to keep all data in a single memory tier, nor is it possible to keep all data in a single machine for some applications, even if the machine has terabytes of memory through a multi-tier organization. As total data volume increases, the hit rate in caches and uppermost memory tier reduces, the latency to obtain the data gets worse with growing miss rates in the upper part of the hierarchy, and the efficiency of CPUs drops from stalls for data and due to waiting for other CPUs in a collaborative computation (e.g., map-reduce). Additionally, conventional protocols only work at a single line granularity (e.g., 64 bytes), which has negative implications in terms of latencies and fabric utilization. To read 1024 bytes from remote memory, such legacy approaches will issue sixteen reads to remote memory, and CPUs may be forced to wait while performing computations on data coming from a remote memory pool.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

Figure 1:
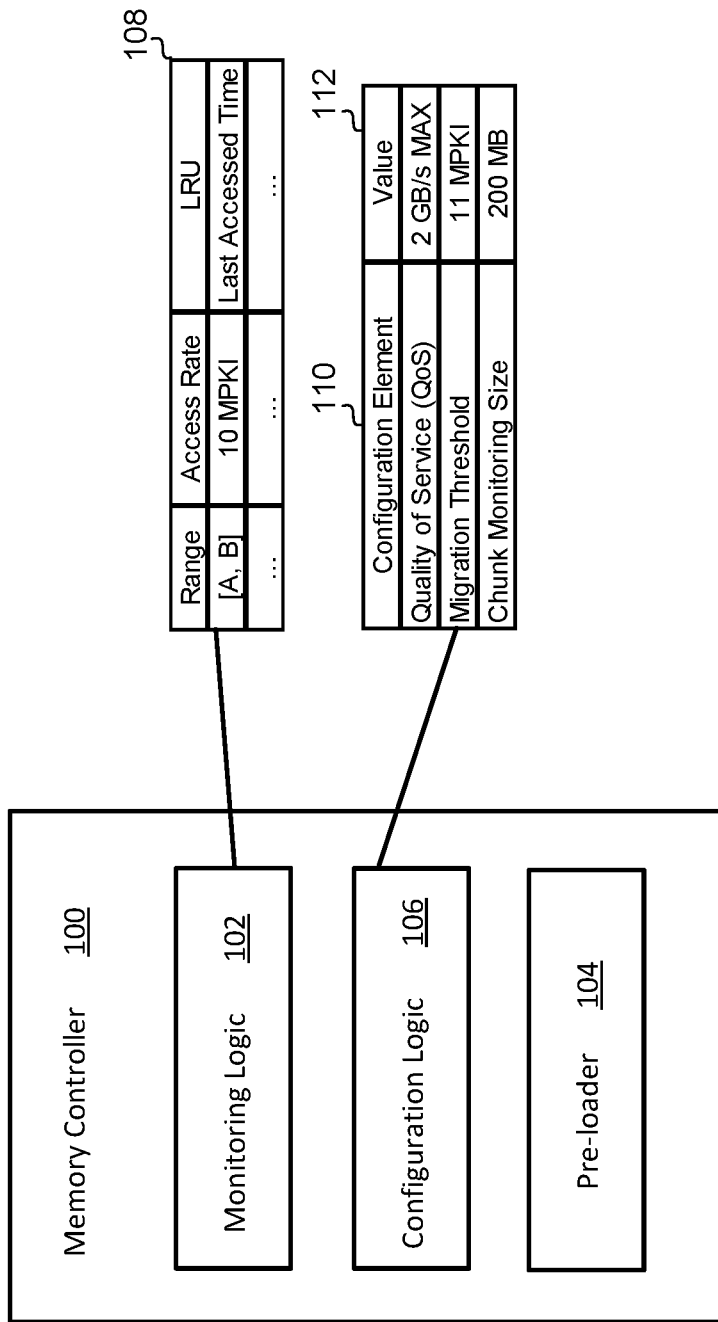
FIG. 1 depicts a block diagram of a memory controller that includes a monitoring logic and a pre-loader, in accordance with various embodiments.

Embodiments of the present disclosure relate to a controller that includes a monitor to determine an access pattern for a range of memory of a first computer memory device, and a pre-loader to pre-load a second computer memory device with a copy of a subset of the range of memory based at least in part on the access pattern, where the subset includes a plurality of cache lines. In some embodiments, the controller includes a specifier and the monitor determines the access pattern based at least in part on one or more configuration elements in the specifier. In some embodiments, the monitor further monitors an executing computer process to detect a pre-load indicator, and the monitor determines the access pattern based at least in part on the pre-load indicator.

In the following description, various aspects of the illustrative implementations will be described using terms commonly employed by those skilled in the art to convey the substance of their work to others skilled in the art. However, it will be apparent to those skilled in the art that embodiments of the present disclosure may be practiced with only some of the described aspects. For purposes of explanation, specific numbers, materials, and configurations are set forth in order to provide a thorough understanding of the illustrative implementations. It will be apparent to one skilled in the art that embodiments of the present disclosure may be practiced without the specific details. In other instances, well-known features are omitted or simplified in order not to obscure the illustrative implementations.

In the following detailed description, reference is made to the accompanying drawings that form a part hereof, wherein like numerals designate like parts throughout, and in which is shown by way of illustration embodiments in which the subject matter of the present disclosure may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B, and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

The term "coupled with," along with its derivatives, may be used herein. "Coupled" may mean one or more of the following. "Coupled" may mean that two or more elements are in direct physical or electrical contact. However, "coupled" may also mean that two or more elements indirectly contact each other, but yet still cooperate or interact with each other, and may mean that one or more other elements are coupled or connected between the elements that are said to be coupled with each other. The term "directly coupled" may mean that two or more elements are in direct contact.

As used herein, the term "module" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable components that provide the described functionality.

FIG. 1 is a block diagram of a memory controller 100 that includes a monitoring logic 102 and a pre-loader 104, in accordance with various embodiments. In some embodiments, the memory controller 100 further includes a configuration logic 106. In various embodiments, the monitoring logic 102 is responsible for tracking how memory chunks are being accessed. Since it may not be practical or cost-effective to track all possible memory ranges, monitoring may be implemented with a cache, in various embodiments. In some embodiments, the monitoring logic 102 is referred to as a monitor and the configuration logic 106 is referred to as a specifier. In some embodiments, the pre-loader 104 is referred to as pre-loading logic.

In some embodiments, the monitoring logic 102 includes a monitoring cache 108 that tracks a finite number of memory chunks from a next level of memory. In some embodiments, the monitoring logic 102 may use a first in first out (FIFO) policy, a least recently used (LRU) policy, or any other suitable policy to determine which trackers to evict from the monitoring cache 108 to make room for new memory ranges to be tracked. In various embodiments, the monitoring cache 108 may have entries that may include one or more of a memory range, an access rate for the memory range, and/or a LRU entry that may include a last accessed time. In some embodiments, the memory range entry in the monitoring cache 108 is a portion of addressable memory specified from a first block A to a second block B in a contiguous set of blocks, designated [A, B] as shown. However, it should be understood that any suitable manner of designating a memory range may be used in various embodiments, such as by using a starting block and a length of the memory chunk to be monitored. In some embodiments, the access rate entry is in units of misses per thousand instructions (MPKI), as shown. However, it should be understood that any suitable manner of designating an access rate may be used in various embodiments. In some embodiments, the LRU entry is a last accessed time. However, it should be understood that any suitable meta-data that can be used by the monitoring logic 102 to determine how to evict entries from the monitoring cache 108 may be used in place of, or in addition to, the LRU entry, in various embodiments.

In some embodiments, the configuration logic 106 includes a set of configuration elements 110 and a set of values 112 that corresponds to the set of configuration elements 110. In various embodiments, the set of configuration elements 110 includes one or more of a quality of service (QoS), a migration threshold, and/or a chunk monitoring size. In some embodiments, the QoS may be specified in the set of values 112 as a maximum bandwidth (e.g., in gigabytes per second (GB/s). In some embodiments, the migration threshold may be specified in the set of values 112 as a threshold access rate or a threshold miss rate (e.g., MPKI). In some embodiments, the chunk monitoring size may be specified in the set of values 112 as a size of memory to be monitored (e.g., in megabytes (MB)). In various embodiments, the configuration logic 106 may define the sizes in which the memory chunks being accessed are to be monitored and read/loaded ahead speculatively. In some embodiments, the QoS configuration element may specify how much memory and/or fabric bandwidth (BW) should be used for speculative transfers. In some embodiments, the migration threshold element may identify when a block needs to be moved to a next tier from a current tier. In various embodiments, the units of the migration threshold may be flexible, and may be in elapsed time, virtual time, numbers of accesses to a tier, or any other suitable units. In some embodiments, when the threshold is exceeded, the corresponding block, and its monitoring entry, may be evicted or earmarked for eviction. In some embodiments, the pre-loader 104 is responsible for aggressive pre-loading when guided by the monitoring logic 102, with a rate controlled by the QoS configuration in the configuration logic 106. In some embodiments, the monitored access rate of a chunk of memory, as stored in the monitoring cache 108, may be compared to the migration threshold stored in the configuration logic 106. In some embodiments, if the monitored access rate is greater than or equal to the migration threshold, the monitoring logic 102 may direct the pre-loader 104 to pre-load the chunk of memory into a closer tier.

Although the monitoring logic 102, the pre-loader 104, and the configuration logic 106 are described as being included in memory controller 100, it should be understood that the monitoring logic 102, the pre-loader 104, and the configuration logic 106 may be included in a host fabric interface (HFI), network interconnect card (NIC) or any other suitable device in other embodiments. In various embodiments, the monitoring logic 102, the pre-loader 104, and the configuration logic 106 may be placed on or in association with a memory tier that is caching one or more farther memory tiers. In some embodiments, a memory tier may be exposed and/or managed by a memory controller or an HFI (or NIC) that includes the monitoring logic 102, the pre-loader 104, and the configuration logic 106.

In some embodiments, the memory controller 100 acts as an interface for one or more physical memories. In various embodiments, the memories controlled by the memory controller 100 may work in a flat mode and/or a memory side cache mode. A memory working in a flat mode may act as a memory storage device, and a memory working in a memory side cache mode may act as a cache for flat memories that reside in other domains, in accordance with various embodiments. In some embodiments, the memory controller 100, providing access to memories acting in a side cache mode, may implement both cache and memory access logic.

Figure 2:
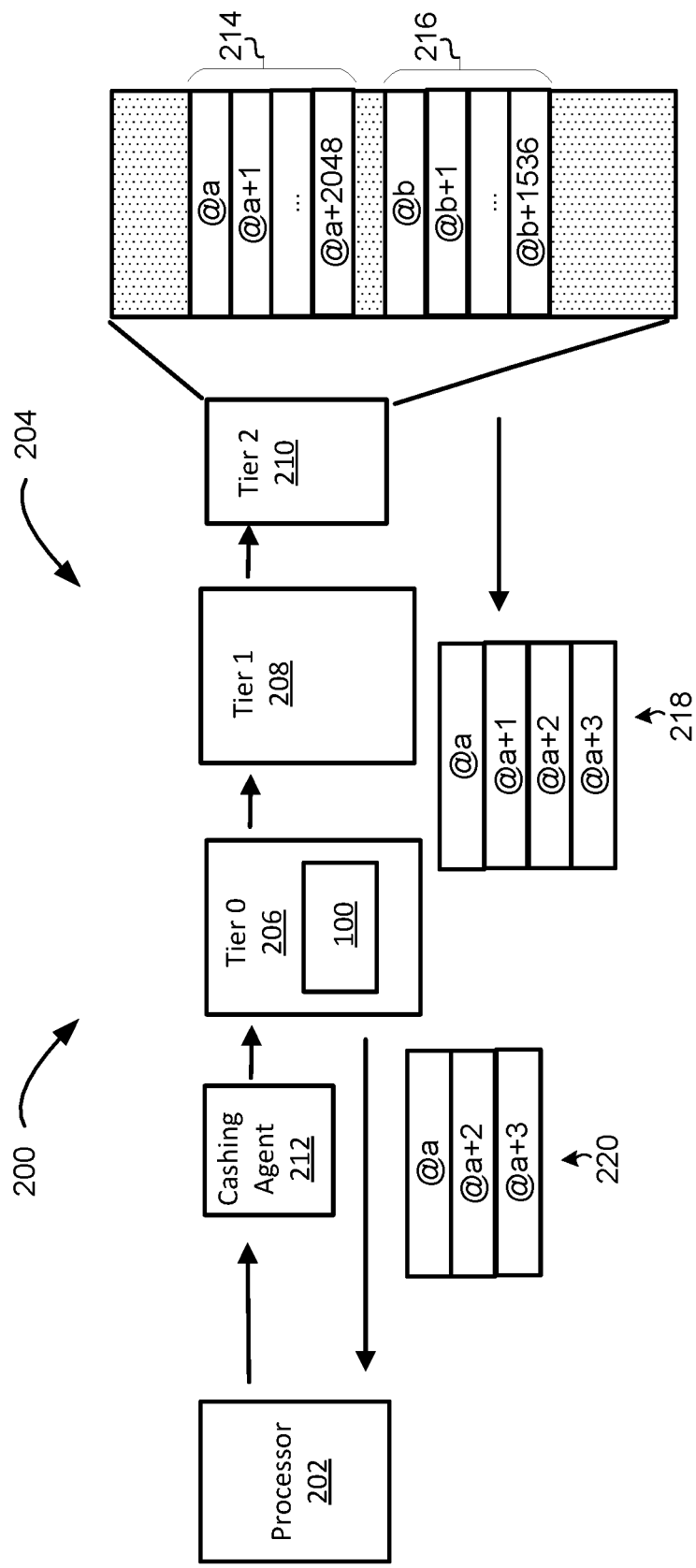
FIG. 2 depicts a block diagram of a computer system with a multi-tier memory system and pre-loading logic, in accordance with various embodiments.

FIG. 2 is a block diagram of a computer system 200 with a multi-tier memory system and pre-loading logic, in accordance with various embodiments. In some embodiments, the computer system 200 includes a processor 202 in data communication with a multi-tier memory system 204. In various embodiments, the multi-tier memory system 204 may be a three-tier memory system that includes a tier 0 memory 206, a tier 1 memory 208, and a tier 2 memory 210. In some embodiments, a caching agent (CA) 212 processes memory space requests from cores of the processor 202. In some embodiments, the tier 0 memory 206 includes the memory controller 100 described with respect to FIG. 1. In some embodiments, the computer system 200 may be a local multi-tier memory system, may be in an intermediate memory pool, or may be located in any other suitable computing environment. In various embodiments, the processor 202 is associated with a cache line length (e.g., a cache line length used by the processor 202). In some embodiments, a first tier of memory (e.g., tier 1 memory 208) nearer to the processor 202 than a second tier of memory (e.g., tier 2 memory 210) may have a lower access latency with respect to the processor 202 than farther tiers of memory.

In some embodiments, a software application running on the processor 202 may identify an interest in processing data blocks in a first memory range 214 and a second memory range 216 (e.g., with one or more indicators or flags).

Although the software is described as using indicators or flags, it should be understood that any suitable type of computable hint about chunks of memory over which a demarcated block of code performs some operation, and over which as a result, it expects spatial locality to be high during the course of that demarcated code block may be used in various embodiments. In various embodiments, the one or more indicators or flags pass from the processor 202 to logic (e.g., monitoring logic 102) at the memory controller 100 associated with the tier 0 memory 206. In some embodiments, when an access to one of the memory ranges identified by the application is detected by the monitoring logic 102, the memory controller 100 may recognize the access as a local access to an outer tier of memory, and may initiate a larger grained fetch from the outer tier. In some embodiments, the indicators are referred to as pre-load indicators and the monitoring logic 102 determines an access pattern based at least in part on one or more pre-load indicators (e.g., by monitoring an executing computer process to detect a pre-load indicator that indicates a memory range to be monitored and determining the access pattern based on the indicated memory range).

In various embodiments, the larger grained fetch may be stored in a transparent buffer as a side cache 218 that the memory controller 100 maintains. As shown, this may be a 256 byte fetch (e.g., four 64 byte cachelines), however, it should be understood that any suitable sized fetch may be performed in various embodiments. Subsequently, as the software application's requests, or prefetches triggered by it, hit the lines (e.g., lines 0, 2, and 3) from this block, they are delivered responsively from the side cache 218, (e.g., as shown in transferred lines 220). In various embodiments, the memory controller 100 may also monitor actual accesses in the first memory range and the second memory range 216, and may adjust the amount of data to bring into the side cache 218, accordingly. In various embodiments, capacity management of the side cache 218 may be performed in any suitable manner (e.g., with a hardware cuckoo hash of a small chain length for each range). In some embodiments, the larger grained fetch may be initiated in response to an access rate (e.g., as tracked in monitoring cache 108) exceeding a migration threshold (e.g., as specified in configuration logic 106).

Figure 3:
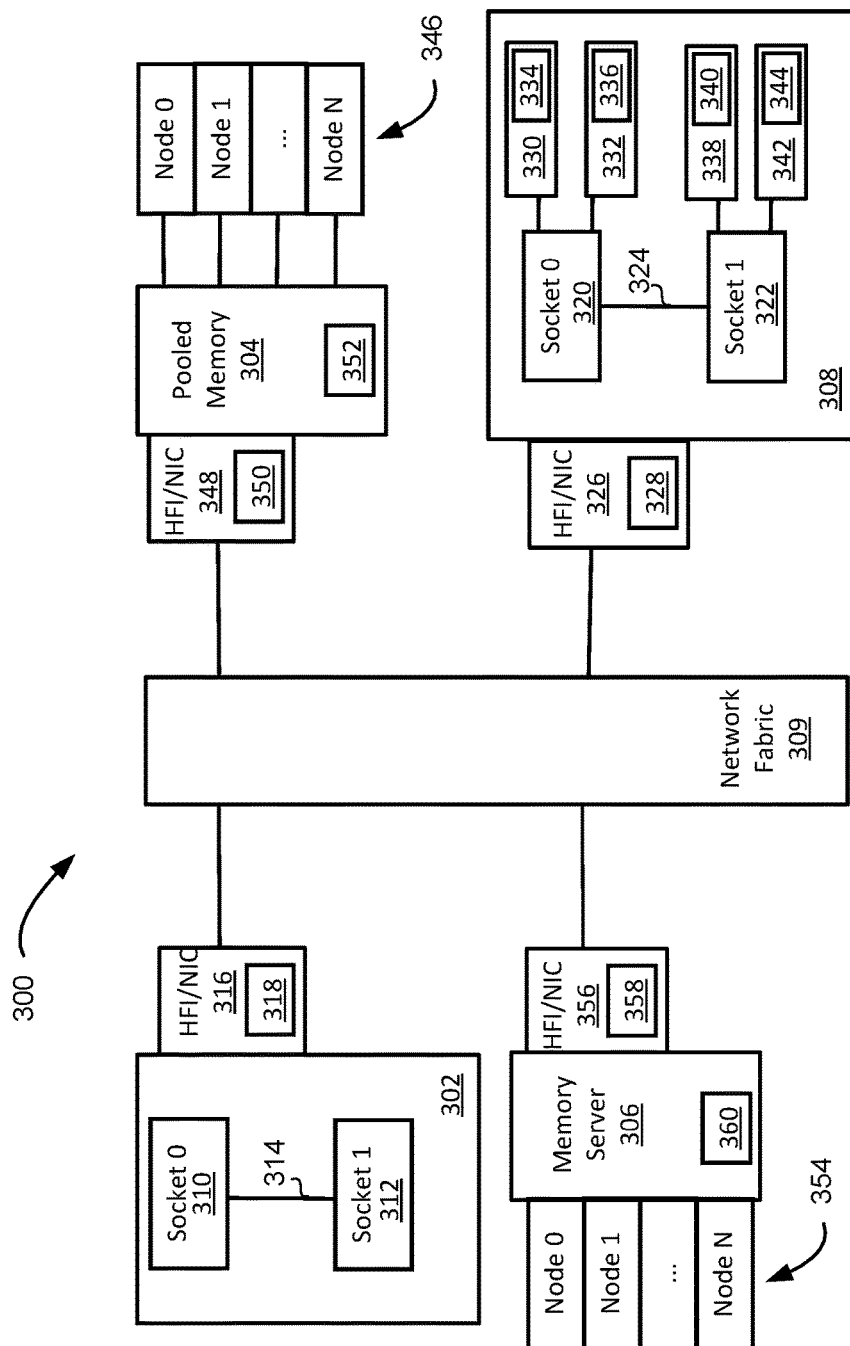
FIG. 3 depicts a block diagram of a networked computing environment, in accordance with various embodiments.

FIG. 3 is a block diagram of a networked computing environment 300, in accordance with various embodiments. In some embodiments, a first computing node 302, a pooled memory node 304, a memory server node 306 with remote direct memory access (RDMA), and a second computing node 308 are communicatively coupled with each other over a network fabric 309. In various embodiments, the network fabric 309 may be any suitable network fabric, such as an Ethernet® fabric, an True Scale® Fabric, an InfiniBand®-based fabric, a RapidIO® fabric, or any other suitable network fabric. In various embodiments, one or more of the nodes (e.g., first computing node 302 or second computing node 308) includes a coherency agent (CHA), not shown for clarity, within the node that processes memory space requests from the cores within the same node. In some embodiments, one or more of the nodes may include a home agent (HA), not shown for clarity, which is responsible for handling memory requests from the CHAs, and acting as a "home" for part of a memory space. In some embodiments, one die may have multiple "homes" across which the system memory space physical addresses are distributed. In various embodiments, the pooled memory node 304 and/or the memory node server 306 may include non-volatile memory (NVM) such as three-dimensional memory (e.g., Intel® 3D XPoint™), or any other suitable type of memory.

In some embodiments, the first computing node 302 includes a first processor 310 in a first socket of the first computing node 302 (e.g., socket 0) and a second processor 312 in a second socket of the first computing node 302 (e.g., socket 1) that may be communicatively coupled with a point-to-point processor interconnect 314 (e.g., an Intel® UltraPath Interconnect (UPI) or QuickPath Interconnect (QPI)). In some embodiments, the point-to-point processor interconnect 314 may be an inter-socket high speed link over which requests or data may be forwarded from/to a core in a first socket (e.g., socket 0) to/from caches or HAs in a second socket (e.g., socket 1) in the node (e.g., first computing node 302) that implements a common coherency domain for the sockets. In some embodiments, the first computing node 302 includes an HFI 316 that includes a controller 318. In various embodiments, the controller 318 includes monitoring logic, configuration logic, and a pre-loader, not shown for clarity, that are configured to operate in similar fashion to the monitoring logic 102, the configuration logic 106, and the pre-loader 104, respectively, described with respect to FIG. 1. In various embodiments, the HFI 316 may be an inter-node high-speed network interface, through which memory space requests are forwarded from a first, or "local" node to a second, or "remote" node, and through which data, messages, packets, etc. are sent back to the local node, by the second node through the second node's HFI. In some embodiments, cores of the first processor 310 and the second processor 312 may cause the on-die-interconnect requests that are sent to a CHA to be stored.

In some embodiments, the networked computing environment 300 may be a multi-node system or cluster that includes two or more coherent domains, between whom requests and responses are performed over their HFIs. In various embodiments, such requests and responses may travel through switches, not shown for clarity, that route data between the HFIs. In some embodiments, the networked computing environment 300 may be a high performance computing (HPC) environment or a data center that may include N clusters or servers that can communicate with each other using the network fabric 309. In various embodiments, using the network fabric 309, each coherent domain may expose some memory address regions to the other coherent domains. In some embodiments, the coherent domains, which may also be referred to as coherence domains, may be groups of cores in a system, together with memory spaces to which the groups of cores can perform load and store operations. In some embodiments, for a coherent domain, a LOAD of any location returns the most recent value sent to that location by another core or CHA in the group. In some embodiments, accesses between different servers may not be coherent, but the network fabric 309 may allow mapping the address of memory ranges between different coherent domains.

In various embodiments, the second computing node 308 includes a first processor 320 in a first socket of the second computing node 308 (e.g., socket 0) and a second processor 322 in a second socket of the second computing node 308 (e.g., socket 1) that may be communicatively coupled with a point-to-point processor interconnect 324. The second computing node 308 includes a HFI/NIC 326 with a controller 328 in some embodiments. In some embodiments, the first processor 320 is coupled with a first tier of memory 330 (e.g., a double data rate (DDR) memory) and a second tier of memory 332 (e.g., a high bandwidth memory (HBM)). In various embodiments, the first tier of memory 330 includes a memory controller 334 configured in similar fashion to the memory controller 100 described with respect to FIG. 1, and the second tier of memory 332 include a memory controller 336 configured in similar fashion to the memory controller 100. In some embodiments, the second processor 322 is coupled with a first tier of memory 338 that includes a memory controller 340 configured in similar fashion to the memory controller 100. In some embodiments, the second processor 322 is coupled with a second tier of memory 342 that includes a memory controller 344 configured in similar fashion to the memory controller 100.

In some embodiments, the pooled memory node 304 is a high capacity memory, accessible through HFI, and shared across nodes. In some embodiments, the pooled memory node 304 may include a plurality of memory nodes 346. In various embodiments, the pooled memory node 304 includes a HFI (NIC) 348 with a controller 350. In some embodiments, the pooled memory node 304 may also include a memory controller 352 configured in similar fashion to the memory controller 100.

In some embodiments, the memory server node 306 may include a plurality of memory nodes 354. In various embodiments, the memory server node 306 includes a HFI (NIC) 356 with a controller 358. In some embodiments, the memory server node 306 may also include a memory controller 360 configured in similar fashion to the memory controller 100.

In some embodiments, the various parts of the hardware data path (e.g., memory controllers and/or HFI (or NIC) controllers) may work together to bring data closer to a higher performance memory tier, adjusting the rate of such data movement to the actual pattern of access at each level (e.g., fabric, local memory tiers, and caches), may have different units of transfer at each point, and/or may have different durations for which the proactively moved data is allowed to remain cached in each memory tier. In some embodiments, the monitoring and policy components for controlling data movement between memory tiers may be included in hardware to guide the data movement without burdening software. In various embodiments, CPU caches may avoid pollution by retaining data in such regions for very short durations (e.g., by treating it as LRU-1, ready for quick demotion to a memory-based staging or victim buffer), while fabric controllers (e.g., the HFIs or NICs) aggregate accesses over a particular chunk size that may be specified with a configuration element in some embodiments.

In some embodiments, the approach of FIGS. 1 and 2 is extended to the networked computing environment 300 of FIG. 3, including the controllers of the HFIs. In some embodiments, if data is homed in a remote memory tier, a block 10 access may be performed instead of using UPI tunneled over fabric. In various embodiments, the data movement may be a staged group access. In some embodiments, the data may be transferred HFI-to-HFI, and a software (SW) block may be scheduled. In some embodiments, a user level interrupt (ULI) may be used by an HFI to inform a SW application that its accesses are available in a low-latency domain after the data has been transferred to a closer memory tier. In cases where a ULI is not available, the HFI may bring in and hold onto data to reduce accesses that go over a UPI-tunnel as cacheline accesses. In some embodiments, soon after the block is transferred, the entire group may be de-prioritized at the fabric level to provide space for staging other lines.

In various embodiments, in order to identify hot memory regions of a particular memory hierarchy, two different approaches may be used, individually or in combination. In a first approach, in accordance with some embodiments, software puts a wrapper around any code during which it performs reads or writes to a particular block(s) of cachelines (e.g., the indicators, flags, or hints discussed above). In various embodiments, the cachelines may not be contiguous, but there may be greater than or equal to a predetermined number within a particular locality distance. In a second approach, in accordance with some embodiments, monitoring hardware in a memory controller (e.g., memory controller 100) of a particular memory tier identifies how particular regions of the next memory tier are being accessed and congested. In various embodiments, monitoring hardware (e.g., monitoring logic 102) in a particular memory tier memory controller, may identify how particular regions of a next memory tier are being accessed. In some embodiments, each memory tier may access the address space of the next memory tier in chunks (e.g., with a size configured in the configuration logic 106) and may monitor its access rate. Above a certain rate (e.g., migration threshold in configuration logic 106), the monitoring logic ma identify that a particular memory chunk needs to be prefetched from the next tier (e.g., by directing the pre-loader 104 to pre-load the memory chunk). In various embodiments, hardware, that may include a controller in an HFI and/or one or more particular memory controllers, may perform aggressive prefetches over all of the cachelines in the identified particular block(s) so that back to back local-remote latency is hidden to the extent possible. In some embodiments, the prefetching may use a scheme that exposes an interface to the software stack to specify temporal usage of the block. In various embodiments, when the prefetch is performed for a chunk of data, not all data may be stored in the nearest tier (e.g., DDR), but may be stored in different tiers, that may be divided in sub-blocks, as the data comes from a farther memory tier (e.g., pooled memory) to the nearest memory tier.

Various embodiments may provide timely stream-through effects in near-memory. In some embodiments, performance of block read/load ahead into a memory tier that is closest to processor caches may apply not just for remote pools, but also for multi-cacheline blocks in local far tiers, where a large performance delta may be expected. The pre-loading according to various embodiments may be different from legacy approaches that bring cachelines into level 1 (L1), level 2 (L2), and/or last level cache (LLC) in that multiple lines may be brought into a near-memory tier, amortizing many of the setup costs for such transactions, and promoted from there into caches in smaller quantities. The pre-loading according to various embodiments may also be different from legacy approaches in that the multiple lines brought into the near-memory tier may not be retained there for long, removing the possibility of capacity oversubscription.

Some embodiments may expose one or more processor caches to other networked nodes (e.g., by leveraging Intel® Data Direct I/O Technology (Intel® DDIO)). Some embodiments may include monitoring and/or control of shared resources such as I/O, bandwidth (BW), LLC, and/or simultaneous multithreading (SMT) (e.g., using Intel® Resource Director Technology (Intel® RDT)). In some embodiments, data brought in by an HFI ahead of its use may be directed to a particular partition (e.g., a DDIO partition) automatically, and may remain in LLC for a short period (e.g., due to a cap such as a DDIO cap). In various embodiments, the computation that guides the multi-block transfer from a remote pool may automatically get a secondary, stream-through effect into LLC similar to that in near-memory.

Various embodiments may provide an early write-back effect. In some embodiments, modified data may get pushed again as a block back to a remote pool. In various embodiments, the modified data may be pushed as a block due to block I/O, caused either by a local HFI pushing a block of modified cachelines (e.g., IO semantic) to a remote pool, or by a pull caused by a remote HFI.

Various embodiments may provide a reduction of pressure on snoop filters. In some embodiments, the snoop filter may not have to use much capacity due to a reduced need for the traditional HW/SW prefetching to bring too many cachelines into processor caches. In various embodiments, even the cachelines that are optionally brought into LLC or inner caches may be aggressively pruned (e.g., by marking them as least recently used twice (LRU2)). Further, rather than retaining a cacheline speculatively in CPUs, some embodiments may allow the cacheline to leave since the block that contains it is retained in a memory tier closer to the CPU considerably longer. In various embodiments, this may reduce latency and save power by reducing the amount of broadcast snoops.

Various embodiments may provide better workload matching than legacy approaches. High tenancy virtualization, rapidly churning container based services, large scale map-reduce activity, ad-hoc analytics, and streaming data analytics all tend to have very low floating point operations per second (FLOPS) to Bytes ratios. Column oriented and in-memory data analytics are typically scan dominated. Database tables in some applications are treated as flat in memory, and operations like max, min, filter-by-key, all have scan as the main operation over cachelines. Various embodiments may provide improved performance and efficiency for these types of workloads by matching streaming behaviors throughout the memory hierarchy and fabric and/or staying ahead of computations with block oriented and/or software guided transient caching services.

In various embodiments, the monitoring logic of one or more of the memory controllers 330, 332, 338, 342, 352, and/or 360, and/or the monitoring logic of one or more of the controllers 318, 328, 350, and/or 358 in the HFIs (NIC) 316, 326, 348, and/or 356, respectively, may determine when to bring in a block of data from remote nodes or rack scale design (RSD) pooled memory. In some embodiments, fabric and remote memory monitors may be used to drop or hold prefetches to match system scenarios. In some embodiments, the monitoring logic of one or more controllers may identify an amount of data to be moved into different tiers, adapting to the capacity and bandwidth scheduling for memory, QoS configuration, and/or power constraints. In some embodiments, the prefetch may specify for a particular chunk of prefetched data (e.g., 1 MB), where particular portions of the chunk are to be stored (e.g., [0-256K in DDR], [256K-512K in 3D Crosspoint], [512K-1024K to network interface card (NIC) HBM]). In some embodiments, the monitoring logic and/or other components of the controllers may be integrated into DDIO and/or RDT devices to identify patterns over remote data that is cached in one or more local memory tiers. In some embodiments, local IO QoS configurations may be dynamically decided in order to ensure sufficient resources (e.g., I/O, BW, and/or LLC) to satisfy the amount of data being prefetched from remote tiers. In some embodiments, the controllers may automate the delivery of cachelines from/to outer tiers into inner-tiers, and into caches, so that instead of HW or SW generating prefetches to pull data speculatively, data streams into the caching tier. In various embodiments, the aggressiveness of the streaming may be determined by the monitored patterns of access. In some embodiments, the data movement may be generalized beyond a remote node by proactively moving different sub-blocks from outer to inner tiers and caches. In various embodiments, the controllers may adapt to the QoS and service level agreement (SLA) needs of different applications in directing data pre-loads and/or cache space assignments.

Figure 4:
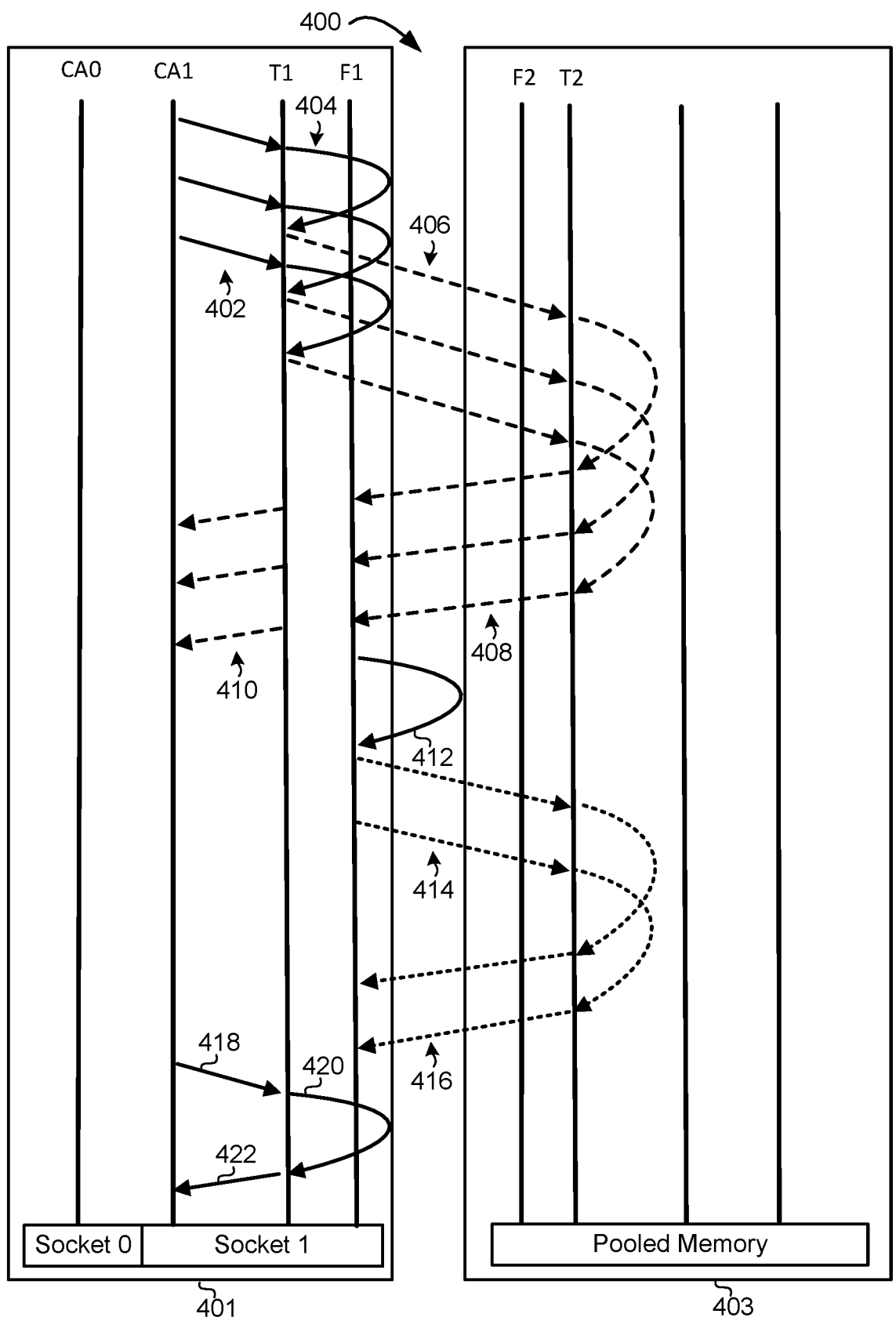
FIG. 4 illustrates a memory pre-loading flow, in accordance with various embodiments.

FIG. 4 illustrates a memory pre-loading flow 400, in accordance with various embodiments. In some embodiments, the memory pre-loading flow 400 may occur with respect to a first node 401 (e.g., computing node 308) and a second node 403 (e.g., pooled memory node 304). In various embodiments, the first node 401 may include a first processor in a first socket, socket 0, and a second processor in a second socket, socket 1. In some embodiments, the second node 403 may include a pooled memory. In various embodiments, the first node 401 may include a first fabric interface (F1) (e.g., HFI/NIC 326) and the second node 403 may include a second fabric interface (F2) (e.g., HFI/NIC 348).

As shown, a first set of data reads 402 from an application may be sent to a local first tier memory (T1) (e.g., first tier of memory 338) from a caching agent (CA1) associated with a processor (e.g., processor 322) in socket 1. The first set of data reads 402 result in a first set of misses 404, with a particular miss rate that may be quantified in terms of MPKI or any other suitable metric. Following each miss in the set of misses 404, a second set of data reads 406 from remote second tier memory (T2) (e.g., from one of memory nodes 346) may be performed. The requested data may be transferred from the remote memory T2 to the local memory T1 in a set of data transfer operations 408 in response to the second set of data reads 406. In various embodiments, the second set of data reads 406 and the set of data transfer operations 408 may occur across a network fabric (e.g., network fabric 309) via F1 and F2. The requested data may then be provided from the local memory T1 to the requesting application in a set of return operations 410.

In various embodiments, a controller (e.g., memory controller 340 or controller 328) monitors application accesses to a range of remote memory (e.g., memory associated with pooled memory node 304) within a particular chunk size (e.g., as specified in the configuration values of configuration logic 106, for example 100 MB). If the first set of misses 404 has a particular miss rate greater than or equal to a specified migration threshold X (e.g., as specified in the configuration values of configuration logic 106), prefetching may be triggered with an operation 412 (e.g., by monitoring logic 102 signaling the pre-loader 104 to pre-load memory). A set of prefetch operations 414 may be performed (e.g., by the pre-loader 104) to pre-load a chunk of memory from the remote memory T2 to the local memory T1 with a set of data transfer operations 416 in response to the prefetch trigger. In some embodiments, the pre-loaded chunk of memory may be the same size that was being monitored, as specified in the configuration logic 106. After the chunk of memory has been pre-loaded into the local memory T1, reads to the range of pre-loaded memory will no longer result in misses, as shown in a data read 418 that results in a hit 420 and a data return 422 from local memory T1 to the application via the caching agent CA1. In various embodiments, the prefetch operations 406 may be performed in the background, and while the data is being moved, requests to that particular chunk may still occur across the network fabric in the foreground. Although the memory pre-loading flow 400 is described with respect to a first tier and a second tier of memory, it should be understood that the flow may also apply to other tiers of memory in various embodiments (e.g., tier 1 to tier 0), and/or may involve data movement between tiers that are not immediately adjacent (e.g., tier 3 to tier 1).

In various embodiments, the memory of one or memory tiers may include a memory whose state is determinate even if power is interrupted to the device. In some embodiments, the memory may include a block addressable mode memory device, such as NAND or NOR technologies, or more specifically, multi-threshold level NAND flash memory (for example, Single-Level Cell ("SLC"), Multi-Level Cell ("MLC"), Quad-Level Cell ("QLC"), Tri-Level Cell ("TLC"), or some other NAND). In some embodiments, the memory may include a byte-addressable write-in-place three dimensional crosspoint memory device, or other byte addressable write-in-place NVM devices, such as single or multi-level Phase Change Memory (PCM) or phase change memory with a switch (PCMS), NVM devices that use chalcogenide phase change material (for example, chalcogenide glass), resistive memory including metal oxide base, oxygen vacancy base and Conductive Bridge Random Access Memory (CB-RAM), nanowire memory, ferroelectric transistor random access memory (FeTRAM), magneto resistive random access memory (MRAM) that incorporates memristor technology, spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, a combination of any of the above, or other suitable memory.

In various embodiments, the memory of one or memory tiers may include a volatile memory whose state (and the data stored in it) is indeterminate if power is interrupted to the device. In various embodiments, dynamic volatile memory may refresh the data stored in the device to maintain state. Examples of dynamic volatile memory may include DRAM (Dynamic Random Access Memory), or some variant thereof, such as Synchronous DRAM (SDRAM).

Figure 5:
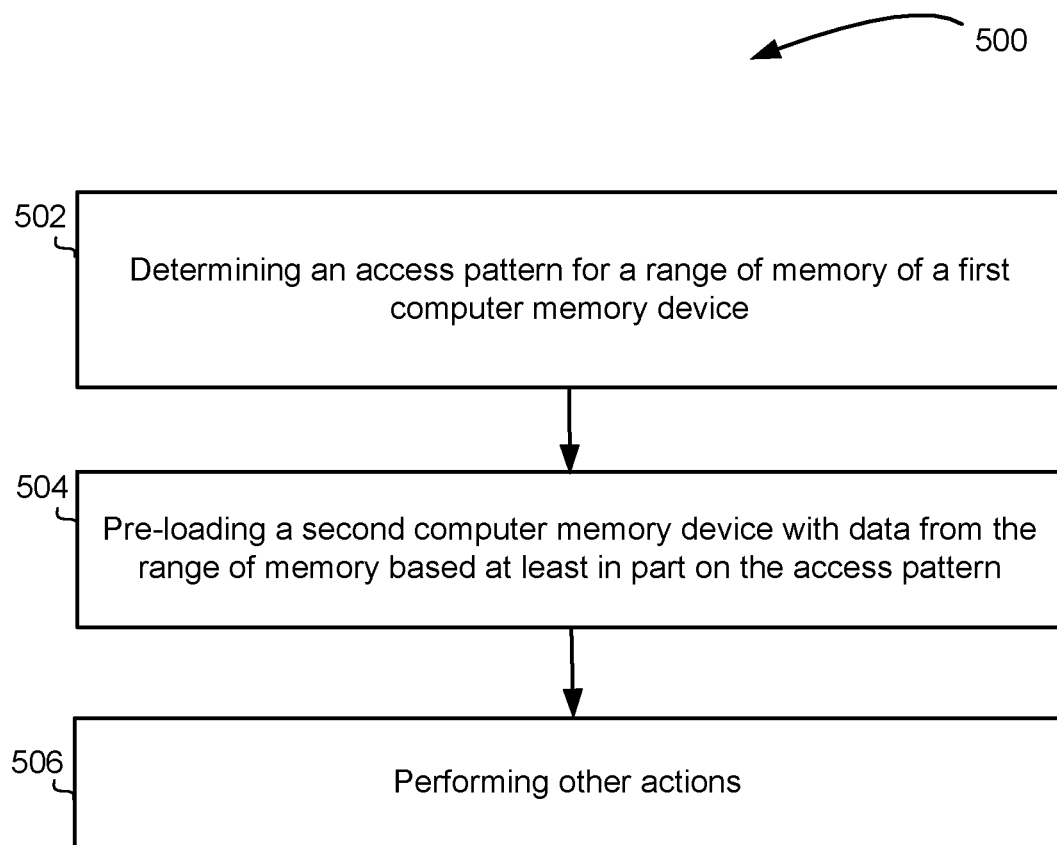
FIG. 5 is a flow diagram of a technique for pre-loading a computer memory device with data, in accordance with various embodiments.

FIG. 5 is a flow diagram of a technique 500 for pre-loading a computer memory device with data, in accordance with various embodiments. In some embodiments, some or all of the technique 500 may be practiced by components shown and/or described with respect to the memory controller 100 of FIG. 1 or a portion thereof (e.g., monitoring logic 102 and pre-loader 104), the computer system 200 of FIG. 2 or a portion thereof (e.g., memory controller 100), one or more components of the networked computing environment 300 of FIG. 3 (e.g., controller 318, 328, 350, or 358, and/or memory controller 334, 336, 340, 344, 352, or 360) or some other component shown or described herein with respect to any other Figure.

In some embodiments, at a block 502, the technique 500 may include determining an access pattern for a range of memory of a first computer memory device (e.g., with a monitor in a memory controller such as monitoring logic 102, or a monitor in a controller of a HFI). In some embodiments, the range of memory is a portion of addressable memory specified from a first block A to a second block B in a contiguous set of blocks, designated [A, B]. However, it should be understood that any suitable manner of designating a memory range may be used in various embodiments. In some embodiments, the access pattern is an access rate of memory blocks within the range of memory. In some embodiments, the access pattern is an access pattern for the range of memory by a computer application, and determining the access pattern includes determining the access rate (e.g., in units of MPKI) for the range of memory, by the computer application, directly or indirectly (e.g., with monitoring logic 102). In some embodiments, the access pattern is an access pattern for the range of memory by a processor (e.g., processor 202), directly or indirectly (e.g., via an intermediate device or memory tier), that is executing the computer application. In various embodiments, at a block 504, the technique 500 may include pre-loading a second computer memory device with data from the range of memory based at least in part on the access pattern (e.g., with a pre-loader such as pre-loader 104). In some embodiments, pre-loading the second computer memory device with data from the range of memory is performed based on one or more techniques described with respect to the pre-loading flow 400. In various embodiments, at a block 506, the technique 500 may include performing other actions as necessary. For example, the actions may include determining, access patterns of one or more additional ranges of memory of the first computer device, where the first range of memory and the one or more additional ranges of memory are included as elements in a specifier. In some embodiments, pre-loading the second computer memory device, at the block 504, may be performed in response to a rate of access to the range of memory is greater than or equal to a migration threshold.

Figure 6:
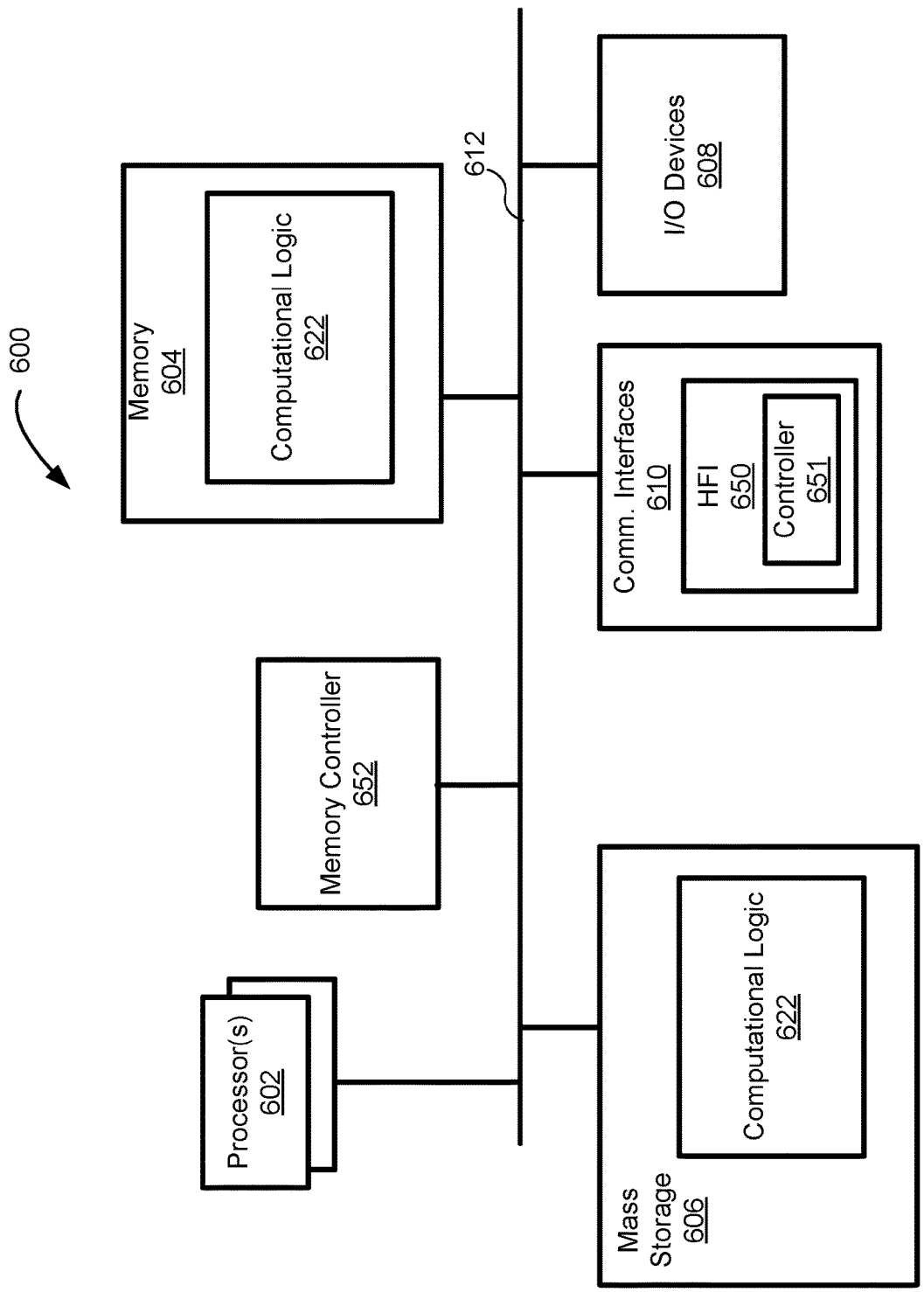
FIG. 6 schematically illustrates an example computing device that includes a memory controller as described herein, in accordance with various embodiments.

FIG. 6 illustrates a block diagram of an example computing device 600 that may be suitable for use with various components of FIG. 1, the computer system 200 of FIG. 2, various components in the networked computing environment 300 of FIG. 3, the pre-loading flow 400 of FIG. 4, and/or the technique 500 of FIG. 5, in accordance with various embodiments.

As shown, computing device 600 may include one or more processors or processor cores 602 and system memory 604. For the purpose of this application, including the claims, the terms "processor" and "processor cores" may be considered synonymous, unless the context clearly requires otherwise. The processor 602 may include any type of processors, such as a central processing unit (CPU), a microprocessor, and the like. The processor 602 may be implemented as an integrated circuit having multi-cores, e.g., a multi-core microprocessor. In some embodiments, processors 602, in addition to cores, may further include hardware accelerators, e.g., hardware accelerators implemented with Field Programmable Gate Arrays (FPGA). The computing device 600 may include mass storage devices 606 (such as diskette, hard drive, non-volatile memory (NVM) (e.g., compact disc read-only memory (CD-ROM), digital versatile disk (DVD), any other type of suitable NVM, and so forth). In general, system memory 604 and/or mass storage devices 606 may be temporal and/or persistent storage of any type, including, but not limited to, volatile and non-volatile memory, optical, magnetic, and/or solid state mass storage, and so forth. Volatile memory may include, but is not limited to, static and/or dynamic random access memory (DRAM). Non-volatile memory may include, but is not limited to, electrically erasable programmable read-only memory, phase change memory, resistive memory, and so forth.

The computing device 600 may further include I/O devices 608 (such as a display (e.g., a touchscreen display), keyboard, cursor control, remote control, gaming controller, image capture device, and so forth) and communication interfaces 610 (such as network interface cards, modems, infrared receivers, radio receivers (e.g., Bluetooth), and so forth), one or more antennas, and/or any other suitable component. In some embodiments, the communication interfaces 610 may include an HFI (NIC) 650 with a controller 651. In various embodiments, the HFI 650 may correspond to the HFI (NIC) 316, 326, 348, or 356 of FIG. 3, and/or the controller 651 may correspond to the controller 318, 328, 350, or 358 of FIG. 3.

The communication interfaces 610 may include communication chips (not shown for clarity) that may be configured to operate the computing device 600 in accordance with a local area network (LAN) (e.g., Ethernet) and/or a Global System for Mobile Communication (GSM), General Packet Radio Service (GPRS), Universal Mobile Telecommunications System (UMTS), High Speed Packet Access (HSPA), Evolved HSPA (E-HSPA), or Long-Term Evolution (LTE) network. The communication chips may also be configured to operate in accordance with Enhanced Data for GSM Evolution (EDGE), GSM EDGE Radio Access Network (GERAN), Universal Terrestrial Radio Access Network (UTRAN), or Evolved UTRAN (E-UTRAN). The communication chips may be configured to operate in accordance with Code Division Multiple Access (CDMA), Time Division Multiple Access (TDMA), Digital Enhanced Cordless Telecommunications (DECT), Evolution-Data Optimized (EV-DO), derivatives thereof, as well as any other wireless protocols that are designated as 3G, 4G, 5G, and beyond. The communication interfaces 610 may operate in accordance with other wireless protocols in other embodiments.

In various embodiments, computing device 600 may include a memory controller 652. In some embodiments, the memory controller 652 or components thereof may be coupled with other components of the computing device 600. In some embodiments, the memory controller 652 may correspond to the memory controller 100 of FIG. 1 and/or FIG. 2, or one or more of the memory controllers shown and/or described with respect to FIG. 3.

The above-described computing device 600 elements may be coupled to each other via system bus 612, which may represent one or more buses. In the case of multiple buses, they may be bridged by one or more bus bridges (not shown). Each of these elements may perform its conventional functions known in the art. In particular, system memory 604 and mass storage devices 606 may be employed to store a working copy and a permanent copy of the programming instructions for the operation of various components of computing device 600, including but not limited to an operating system of computing device 600, one or more applications, operations associated with computing device 600, operations associated with the memory controller 652, and/or operations associated with the HFI 650, collectively denoted as computational logic 622. The various elements may be implemented by assembler instructions supported by processor(s) 402 or high-level languages that may be compiled into such instructions. In some embodiments, the computing device 600 may be implemented as a fixed function ASIC, a FPGA, or any other suitable device with or without programmability or configuration options.

The permanent copy of the programming instructions may be placed into mass storage devices 606 in the factory, or in the field through, for example, a distribution medium (not shown), such as a compact disc (CD), or through communication interface 610 (from a distribution server (not shown)). That is, one or more distribution media having an implementation of the agent program may be employed to distribute the agent and to program various computing devices.

The number, capability, and/or capacity of the elements 608, 610, 612 may vary, depending on whether computing device 600 is used as a stationary computing device, such as a set-top box or desktop computer, or a mobile computing device, such as a tablet computing device, laptop computer, game console, or smartphone. Their constitutions are otherwise known, and accordingly will not be further described.

For some embodiments, at least one of processors 602 may be packaged together with computational logic 622 configured to practice aspects of embodiments described herein to form a System in Package (SiP) or a System on Chip (SoC).

In various implementations, the computing device 600 may comprise one or more components of a data center, a laptop, a netbook, a notebook, an ultrabook, a smartphone, a tablet, an ultra-mobile PC, or a mobile phone. In some embodiments, the computing device 600 may include one or more components of a server. In further implementations, the computing device 600 may be any other electronic device that processes data.

Figure 7:
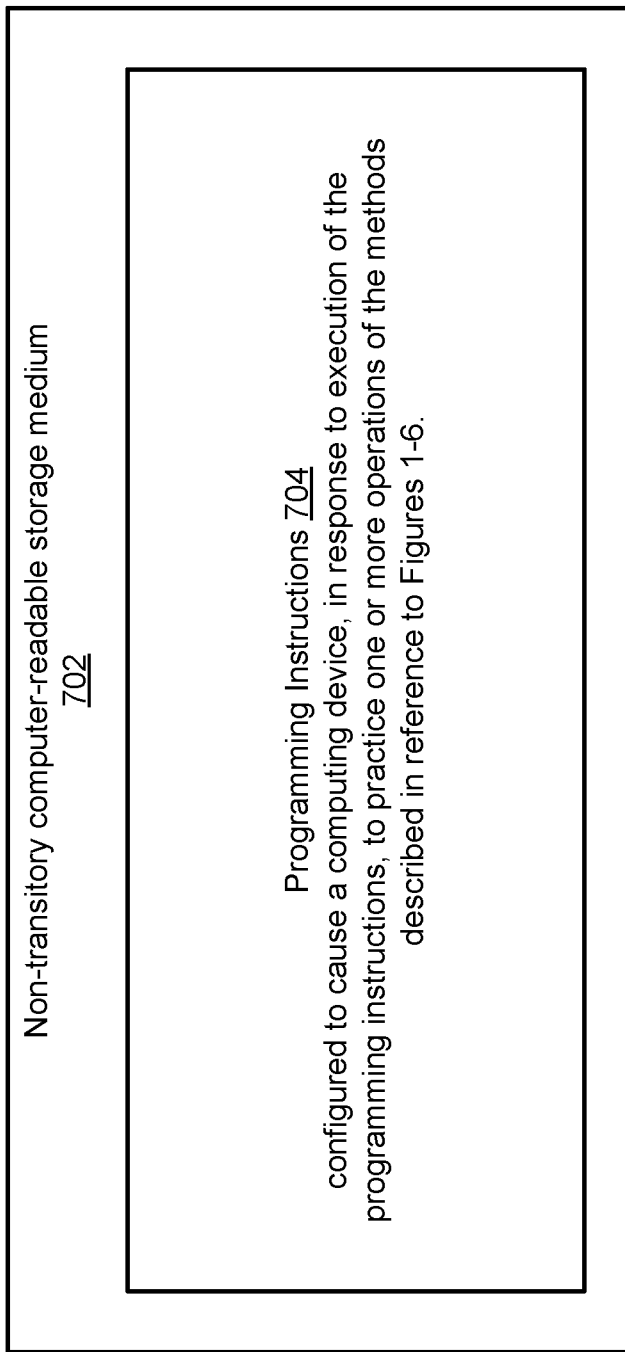
FIG. 7 illustrates an example storage medium with instructions configured to enable an apparatus to practice various aspects of the present disclosure, in accordance with various embodiments.

FIG. 7 illustrates an example computer-readable storage medium 702 having instructions configured to practice all or selected ones of the operations associated with the computing device 600, earlier described with respect to FIG. 6; the memory controller 100, monitoring logic 102, pre-loader 104, and/or the configuration logic 106 described with respect to FIG. 1; one or more memory controllers and/or HFI controllers described with respect to FIG. 3; the memory pre-loading flow 400 of FIG. 4; and/or the technique 500 of FIG. 5, in accordance with various embodiments.

As illustrated, computer-readable storage medium 702 may include a number of programming instructions 704. The storage medium 702 may represent a broad range of non-transitory persistent storage medium known in the art, including but not limited to flash memory, dynamic random access memory, static random access memory, an optical disk, a magnetic disk, etc. Programming instructions 704 may be configured to enable a device, e.g., part or all of the memory controller 100 of FIG. 1 and/or FIG. 2, part or all of a memory controller and/or HFI controller described with respect to FIG. 3, in response to execution of the programming instructions 704, to perform, e.g., but not limited to, various operations described for the monitoring logic 102, the pre-loader 104, the configuration logic 106, the controller 651 and/or the memory controller 652 of FIG. 6, the memory pre-loading flow 400 of FIG. 4, and/or the technique 500 of FIG. 5. In alternate embodiments, programming instructions 704 may be disposed on multiple computer-readable storage media 702. In an alternate embodiment, storage medium 702 may be transitory, e.g., signals encoded with programming instructions 704.

Referring back to FIG. 6, for an embodiment, at least one of processors 602 may be packaged together with memory having all or portions of computational logic 622 configured to practice aspects shown or described for part or all of the memory controller 100 of FIG. 1 and/or FIG. 2; part or all of a memory controller and/or HFI controller described with respect to FIG. 3; the monitoring logic 102, the pre-loader 104, and/or the configuration logic 106 of FIG. 1; the controller 651 and/or the memory controller 652 of FIG. 6; the memory pre-loading flow 400 of FIG. 4; and/or the technique 500 of FIG. 5. For an embodiment, at least one of processors 602 may be packaged together with memory having all or portions of computational logic 622 configured to practice aspects described for part or all of the memory controller 100 of FIG. 1 and/or FIG. 2; part or all of a memory controller and/or HFI controller described with respect to FIG. 3; the monitoring logic 102, the pre-loader 104, and/or the configuration logic 106 of FIG. 1; the controller 651 and/or the memory controller 652 of FIG. 6; the memory pre-loading flow 400 of FIG. 4; and/or the technique 500 of FIG. 5 to form a System in Package (SiP). For an embodiment, at least one of processors 602 may be integrated on the same die with memory having all or portions of computational logic 622 configured to practice aspects described for part or all of the memory controller 100 of FIG. 1 and/or FIG. 2; part or all of a memory controller and/or HFI controller described with respect to FIG. 3; the monitoring logic 102, the pre-loader 104, and/or the configuration logic 106 of FIG. 1; the controller 651 and/or the memory controller 652 of FIG. 6; the memory pre-loading flow 400 of FIG. 4; and/or the technique 500 of FIG. 5. For an embodiment, at least one of processors 602 may be packaged together with memory having all or portions of computational logic 622 configured to practice aspects of part or all of the memory controller 100 of FIG. 1 and/or FIG. 2; part or all of a memory controller and/or HFI controller described with respect to FIG. 3; the monitoring logic 102, the pre-loader 104, and/or the configuration logic 106 of FIG. 1; the controller 651 and/or the memory controller 652 of FIG. 6; the memory pre-loading flow 400 of FIG. 4; and/or the technique 500 of FIG. 5 to form a System on Chip (SoC).

Machine-readable media (including non-transitory machine-readable media, such as machine-readable storage media), methods, systems and devices for performing the above-described techniques are illustrative examples of embodiments disclosed herein. Additionally, other devices in the above-described interactions may be configured to perform various disclosed techniques.

Various components described herein may be a means for performing the operations or functions described. Each component described herein may include software, hardware, or a combination of these. The components may be implemented as software modules, hardware modules, special-purpose hardware (e.g., application specific hardware, application specific integrated circuits (ASICs), digital signal processors (DSPs), etc.), embedded controllers, hardwired circuitry, and/or any other suitable hardware or software component. Besides what is described herein, various modifications may be made to the disclosed embodiments and implementations of the invention without departing from their scope.

EXAMPLES

According to various embodiments, the present disclosure describes a number of examples.

Example 1 is a controller comprising: a monitor to determine an access pattern for a range of memory of a first computer memory device by a processor; and a pre-loader to pre-load a second computer memory device with a copy of a subset of the range of memory based at least in part on the access pattern, wherein the processor is associated with a cache line length and the subset of the range of memory has a length that corresponds to a plurality of the cache line lengths.

Example 2 includes the subject matter of Example 1, wherein the monitor is further to monitor an executing computer process to detect a pre-load indicator, and the monitor is to determine the access pattern based at least in part on the pre-load indicator.

Example 3 includes the subject matter of Example 1, wherein the controller further includes a specifier and the pre-loader is to pre-load the second computer memory device based at least in part on one or more configuration elements in the specifier, wherein the one or more configuration elements include one or more of a quality of service (QoS) indicator, a migration threshold, or a chunk monitoring size.

Example 4 includes the subject matter of Example 3, wherein the one or more configuration elements includes the migration threshold, the migration threshold is a threshold access rate, and the pre-loader is to pre-load the second computer memory device in response to the access pattern is greater than or equal to the threshold access rate.

Example 5 includes the subject matter of Example 1, wherein the range of memory is a portion of addressable memory specified from a first block to a second block in a contiguous set of blocks.

Example 6 includes the subject matter of Example 5, wherein the access pattern is an access rate of memory blocks within the range of memory.

Example 7 includes the subject matter of Example 1, wherein the first computer memory device is a pooled memory device, and wherein the pre-loader is to preload the second computer memory device from the first computer memory device over a network.

Example 8 includes the subject matter of Example 1, wherein the first computer memory device and the second computer memory device are on a local computing platform, and wherein the pre-loader is to preload the second computer memory device from the first computer memory device over a local bus.

Example 9 includes the subject matter of Example 1, wherein the monitor includes a monitoring cache, the monitor is to determine access patterns for ranges of memory identified in the monitoring cache, and the monitor is to evict entries from the cache based at least in part on an eviction policy.

Example 10 includes the subject matter of Example 1, wherein the first computer memory device is a first tier of memory and the second computer memory device is a second tier of memory nearer to the processor with respect to access latency than the first tier of memory.

Example 11 includes the subject matter of Example 1, wherein the monitor and the pre-loader are included in a memory controller.

Example 12 includes the subject matter of Example 1, wherein the monitor and the pre-loader are included in a host fabric interface (HFI) or a network interconnect card (NIC).

Example 13 is a method of pre-loading computer memory comprising: determining, by a controller, an access pattern for a range of memory of a first computer memory device by a processor; and pre-loading, by the controller, a second computer memory device with data from the range of memory based at least in part on the access pattern, wherein the processor is associated with a cache line length and the data has a length that corresponds to a plurality of the cache line lengths.

Example 14 includes the subject matter of Example 13, wherein the range of memory is a first range of memory and the method further comprises: determining, by the controller, access patterns of one or more additional ranges of memory of the first computer memory device, wherein the first range of memory and the one or more additional ranges of memory are included as configuration elements in a specifier, wherein the one or more configuration elements include one or more of a quality of service (QoS) indicator, a migration threshold, or a chunk monitoring size.

Example 15 includes the subject matter of Example 13, wherein determining the access pattern includes determining a rate of access to the range of memory, and wherein pre-loading the second computer memory device is based at least in part on the rate of access to the range of memory is greater than or equal to a migration threshold.

Example 16 includes the subject matter of Example 13, further comprising detecting a pre-load indicator from an executing computer process, wherein determining the access pattern for the range of memory is based at least in part on the pre-load indicator.

Example 17 is a computer system comprising: a first memory device; and a network interface coupled with the first memory device, wherein the network interface includes: a monitor to determine an access pattern for a range of memory of a second memory device over a network fabric by a processor, wherein the second memory device is a remote memory device; and a pre-loader to pre-load the first memory device with a copy of a subset of the range of memory based at least in part on the access pattern, wherein processor is associated with a cache line length and the subset of the range of memory has a length that corresponds to a plurality of the cache line lengths.

Example 18 includes the subject matter of Example 17, wherein the monitor is a first monitor, the pre-loader is a first pre-loader, and the computer system further includes: a third memory device; and a memory controller that includes: a second monitor to determine an access pattern for a range of memory of the first memory device; and a second pre-loader to pre-load the third memory device with a copy of a subset of the range of memory of the first memory device based at least in part on the access pattern of the range of memory of the first memory device.

Example 19 includes the subject matter of Example 18, wherein the subset of the range of memory of the first memory device pre-loaded to the third memory device is smaller than the subset of the range of memory of the second memory device pre-loaded to the first memory device.

Example 20 includes the subject matter of Example 17, wherein the second memory device is a pooled memory device.

Various embodiments may include any suitable combination of the above-described embodiments including alternative (or) embodiments of embodiments that are described in conjunctive form (and) above (e.g., the "and" may be "and/or"). Furthermore, some embodiments may include one or more articles of manufacture (e.g., non-transitory computer-readable media) having instructions stored thereon that, when executed, result in actions of any of the above-described embodiments. Moreover, some embodiments may include apparatuses or systems having any suitable means for carrying out the various operations of the above-described embodiments.

The above description of illustrated implementations, including what is described in the Abstract, is not intended to be exhaustive or to limit the embodiments of the present disclosure to the precise forms disclosed. While specific implementations and examples are described herein for illustrative purposes, various equivalent modifications are possible within the scope of the present disclosure, as those skilled in the relevant art will recognize.

These modifications may be made to embodiments of the present disclosure in light of the above detailed description. The terms used in the following claims should not be construed to limit various embodiments of the present disclosure to the specific implementations disclosed in the specification and the claims. Rather, the scope is to be determined entirely by the following claims, which are to be construed in accordance with established doctrines of claim interpretation.

We claim:

1. A controller comprising:
    a monitor to determine an access pattern for a range of memory of a first computer memory device by a processor; and
    a pre-loader to pre-load a second computer memory device with a copy of a subset of the range of memory based at least in part on the access pattern, wherein the processor is associated with a cache line length and the subset of the range of memory has a length that corresponds to a plurality of the cache line lengths.

2. The controller of claim 1, wherein the monitor is further to monitor an executing computer process to detect a pre-load indicator, and the monitor is to determine the access pattern based at least in part on the pre-load indicator.

3. The controller of claim 1, wherein the controller further includes a specifier and the pre-loader is to pre-load the second computer memory device based at least in part on one or more configuration elements in the specifier, wherein the one or more configuration elements include one or more of a quality of service (QoS) indicator, a migration threshold, or a chunk monitoring size.

4. The controller of claim 3, wherein the one or more configuration elements includes the migration threshold, the migration threshold is a threshold access rate, and the pre-loader is to pre-load the second computer memory device in response to the access pattern is greater than or equal to the threshold access rate.

5. The controller of claim 1, wherein the range of memory is a portion of addressable memory specified from a first block to a second block in a contiguous set of blocks.

6. The controller of claim 5, wherein the access pattern is an access rate of memory blocks within the range of memory.

7. The controller of claim 1, wherein the first computer memory device is a pooled memory device, and wherein the pre-loader is to preload the second computer memory device from the first computer memory device over a network.

8. The controller of claim 1, wherein the first computer memory device and the second computer memory device are on a local computing platform, and wherein the pre-loader is to preload the second computer memory device from the first computer memory device over a local bus.

9. The controller of claim 1, wherein the monitor includes a monitoring cache, the monitor is to determine access patterns for ranges of memory identified in the monitoring cache, and the monitor is to evict entries from the cache based at least in part on an eviction policy.

10. The controller of claim 1, wherein the first computer memory device is a first tier of memory and the second computer memory device is a second tier of memory nearer to the processor with respect to access latency than the first tier of memory.

11. The controller of claim 1, wherein the monitor and the pre-loader are included in a memory controller.

12. The controller of claim 1, wherein the monitor and the pre-loader are included in a host fabric interface (HFI) or a network interconnect card (NIC).

13. A method of pre-loading computer memory comprising:
    determining, by a controller, an access pattern for a range of memory of a first computer memory device by a processor; and
    pre-loading, by the controller, a second computer memory device with data from the range of memory based at least in part on the access pattern, wherein the processor is associated with a cache line length and the data has a length that corresponds to a plurality of the cache line lengths.

14. The method of claim 13, wherein the range of memory is a first range of memory and the method further comprises:
determining, by the controller, access patterns of one or more additional ranges of memory of the first computer memory device, wherein the first range of memory and the one or more additional ranges of memory are included as configuration elements in a specifier, wherein the one or more configuration elements include one or more of a quality of service (QoS) indicator, a migration threshold, or a chunk monitoring size.

15. The method of claim 13, wherein determining the access pattern includes determining a rate of access to the range of memory, and wherein pre-loading the second computer memory device is based at least in part on the rate of access to the range of memory is greater than or equal to a migration threshold.

16. The method of claim 13, further comprising detecting a pre-load indicator from an executing computer process, wherein determining the access pattern for the range of memory is based at least in part on the pre-load indicator.

17. A computer system comprising:
a first memory device; and
a network interface coupled with the first memory device, wherein the network interface includes:
a monitor to determine an access pattern for a range of memory of a second memory device over a network fabric by a processor, wherein the second memory device is a remote memory device; and
a pre-loader to pre-load the first memory device with a copy of a subset of the range of memory based at least in part on the access pattern, wherein the processor is associated with a cache line length and the subset of the range of memory has a length that corresponds to a plurality of the cache line lengths.

18. The computer system of claim 17, wherein the monitor is a first monitor, the pre-loader is a first pre-loader, and the computer system further includes:
a third memory device; and
a memory controller that includes:
a second monitor to determine an access pattern for a range of memory of the first memory device; and
a second pre-loader to pre-load the third memory device with a copy of a subset of the range of memory of the first memory device based at least in part on the access pattern of the range of memory of the first memory device.

19. The computer system of claim 18, wherein the subset of the range of memory of the first memory device pre-loaded to the third memory device is smaller than the subset of the range of memory of the second memory device pre-loaded to the first memory device.

20. The computer system of claim 17, wherein the second memory device is a pooled memory device.

* * * * *